US012475771B2

(12) United States Patent
Nallaperumal

(10) Patent No.: US 12,475,771 B2
(45) Date of Patent: Nov. 18, 2025

(54) SECURITY AND ENHANCEMENT FOR SMOKE DETECTOR

(71) Applicant: Carrier Corporation, Palm Beach Gardens, FL (US)

(72) Inventor: Pirammanayagam Nallaperumal, Telangana (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 246 days.

(21) Appl. No.: 18/307,774

(22) Filed: Apr. 26, 2023

(65) Prior Publication Data

US 2024/0087436 A1 Mar. 14, 2024

Related U.S. Application Data

(60) Provisional application No. 63/336,705, filed on Apr. 29, 2022.

(51) Int. Cl.
*G08B 17/10* (2006.01)

(52) U.S. Cl.
CPC .................................... *G08B 17/10* (2013.01)

(58) Field of Classification Search
None
See application file for complete search history.

(56) References Cited

U.S. PATENT DOCUMENTS

| | | | | |
|---|---|---|---|---|
| 6,762,686 | B1 | 7/2004 | Tabe | |
| 7,994,928 | B2 | 8/2011 | Richmond | |
| 8,035,527 | B2 * | 10/2011 | Powell | G08B 17/06 340/606 |
| 10,970,985 | B2 * | 4/2021 | Antar | G08B 17/10 |
| 11,244,551 | B2 * | 2/2022 | Escofet Via | G08B 17/06 |
| 11,302,174 | B1 * | 4/2022 | Antar | H04N 7/188 |

* cited by examiner

*Primary Examiner* — K. Wong
(74) *Attorney, Agent, or Firm* — CANTOR COLBURN LLP

(57) ABSTRACT

A smoke detector system is provided and includes a smoke detection element; and at least one of a door sensor and a window sensor. The smoke detection element is communicative with the at least one of the door sensor and the window sensor and is configured to read a status of the at least one of the door sensor and the window sensor and to take action related to one or more of remote user notification of status, change in monitoring of parameters and local user indication related to sensor status.

19 Claims, 2 Drawing Sheets

SECURITY AND ENHANCEMENT FOR SMOKE DETECTOR

CROSS-REFERENCE TO RELATED APPLICATIONS

This application claims the benefit of U.S. Provisional Application No. 63/336,705 filed Apr. 29, 2022, the disclosure of which is incorporated herein by reference in its entirety.

BACKGROUND

The following description relates to smoke detectors and, more specifically, to security and enhancements of smoke detectors.

It is well known that home safety is provided by smoke detectors. This can be improved by having door/window/motion detectors all being communicative with smoke sensors and thereby forming a full-fledged security system. In some cases, such as full-fledged security system can communicate with backend servers. In some cases, smoke detection technology can be further advanced by the addition of motion sensors within or as part of a smoke detector enclosure itself so that the smoke detector can provide intrusion detection to the home.

BRIEF DESCRIPTION

According to an aspect of the disclosure, a smoke detector system is provided and includes a smoke detection element; and at least one of a door sensor and a window sensor. The smoke detection element is communicative with the at least one of the door sensor and the window sensor and is configured to read a status of the at least one of the door sensor and the window sensor and to report as to the status.

In accordance with additional or alternative embodiments, the status of the at least one of the door sensor and the window sensor includes an opened or closed indication.

In accordance with additional or alternative embodiments, the smoke detection element is communicative with the at least one of the door sensor and the window sensor via a local network and the smoke detection element is further communicative with a cloud-based network.

In accordance with additional or alternative embodiments, the smoke detection element is further configured to report as to an alarm previously issued by the smoke detection element but not communicated when at least one of the door sensor and the window sensor triggers an open event.

In accordance with additional or alternative embodiments, the smoke detection element is configurable to suppress alerts during user absences.

In accordance with additional or alternative embodiments, the smoke detection element is re-configurable by an authorized user other than the user to resume alarms.

According to an aspect of the disclosure, a smoke detector system is provided and includes a smoke detection element, a door sensor and a window sensor. The smoke detection element is communicative with the door sensor and the window sensor and is configured to read a status of the door sensor and the window sensor and to report as to the status and is further configured to report as to an alarm previously issued by the smoke detection element, the door sensor and/or the window sensor but which was not communicated.

In accordance with additional or alternative embodiments, the status of the door sensor and the window sensor includes an opened or closed indication.

In accordance with additional or alternative embodiments, smoke detection element is communicative with the door sensor and the window sensor via a local network.

In accordance with additional or alternative embodiments, the local network is a Bluetooth™ network.

In accordance with additional or alternative embodiments, the smoke detection element is further communicative with a cloud-based network.

In accordance with additional or alternative embodiments, the smoke detection element is configurable to suppress alerts during user absences.

In accordance with additional or alternative embodiments, the smoke detection element is re-configurable by an authorized user other than the user to resume alarms.

According to an aspect of the disclosure, a smoke detector system is provided and includes a smoke detection element, a door sensor and a window sensor. The smoke detection element is communicative with the door sensor and the window sensor, is configured to read a status of the door sensor and the window sensor and to report as to the status and is further configured to suppress alerts during user absences.

In accordance with additional or alternative embodiments, the status of the door sensor and the window sensor includes an opened or closed indication.

In accordance with additional or alternative embodiments, the smoke detection element is communicative with the door sensor and the window sensor via a local network.

In accordance with additional or alternative embodiments, the local network is a Bluetooth™ network.

In accordance with additional or alternative embodiments, the smoke detection element is further communicative with a cloud-based network.

In accordance with additional or alternative embodiments, the smoke detection element is re-configurable by an authorized user other than the user to resume alarms.

In accordance with additional or alternative embodiments, the smoke detection element is further configured to report as to an alarm previously issued by the smoke detection element, the door sensor and/or the window sensor but which was not communicated.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

It is to be understood that safety and security go hand-in-hand and that smoke detectors provided for residential fire safety are an integral part of safety and security measures. With upcoming smoke detectors having connectivity capabilities, additional functionality is open. For example, it is possible to provide for security to the home and to further enhance smoke detector operations.

Thus, as will be described below, a smoke detector system is provided in which a smoke detection element is communicative with one or more of door and window sensors through a residence. This communication allows the smoke detection element to perform status checks, to communicate previously issued alarms that were not communicated and to at least temporarily suppress alerts.

Figure 1:
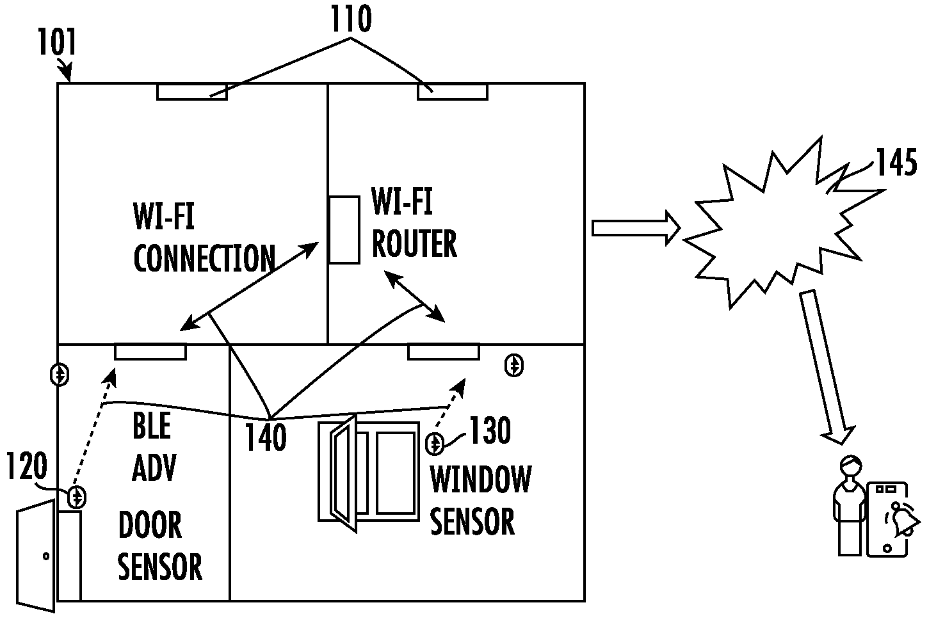
FIG. 1 is a schematic illustration of a smoke detector system in accordance with exemplary embodiments.

With reference to FIG. 1, a smoke detector system 101 is provided. The smoke detector system 101 includes a smoke detection element 110, such as a smoke detector, and at least one of a door sensor 120 and a window sensor 130 (for purposes of clarity and brevity, the following description will relate to cases in which the door sensor 120 and the window sensor 130 are both included in the smoke detector system 101). The smoke detection element 110 is communicative with both the door sensor 120 and the window sensor 130 via a local network 140, such as a Bluetooth™ network, and is further communicative with a cloud-based or wide area network 145. The smoke detection element 110 is configured to read a status (i.e., is the door or window opened or closed) of the door sensor 120 and the window sensor 130 and to take action related to one or more of: a remote user notification of status, a change in monitoring of parameters and a local user indication related to sensor status.

Figure 2:
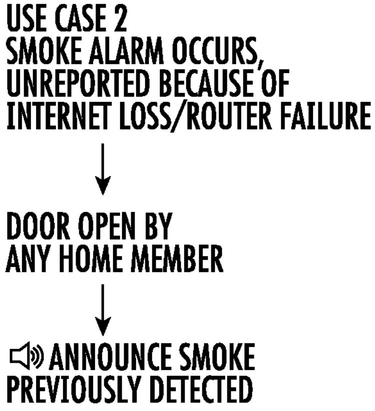
FIG. 2 is a flow diagram describing a use case of the smoke detector system of FIG. 1 in accordance with exemplary embodiments.

In accordance with embodiments and as shown in FIG. 2, the smoke detection element 110 is further configured to report as to an alarm that was previously issued by the door sensor 120, the window sensor 130 or any other connected sensor but which was not communicated for some reason (i.e., a loss of network communications, a loss of power). Thus, in an event of an alarm being issued that was unreported for some reason, the alarm can be reported to a user's smartphone when a predefined incident (e.g., the user enters the house where the alarm occurred) occurs. In this way, if there was a fire in the house that the user was not warned about due to the smoke detection element 110 not having communications capability, the user can be warned as to the issue when he enters the house so that he can protect himself or leave. Similarly, if there was an intruder in the house that the user was not warned about due to the door sensor 120 not having communications capability, the user can be warned as to the issue when he enters the house so that he can leave immediately or take necessary action.

Figure 3:
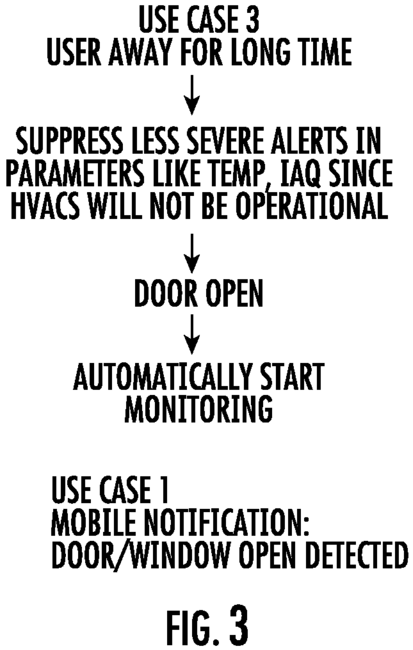
FIG. 3 is a flow diagram describing a use case of the smoke detector system of FIG. 1 in accordance with exemplary embodiments.

In accordance with embodiments and as shown in FIG. 3, the smoke detection element 110 is configurable to suppress alerts during user absences and can be re-configurable by an authorized user other than the user to resume alerts. Thus, if the user leaves his house to go on vacation for a week, and the smoke detection element 110 detects issues like elevated temperatures or internal air quality (IAQ) issues, the user can be free of annoying alerts that might otherwise needlessly disturb him. On the other hand, if a member of the user's family returns home, if the member is authorized, the smoke detection element 110 to resume alerts on the entry of that person.

Technical effects and benefits of the present disclosure are the provision of a smoke detector system with enhanced security through performing status checks, communications of previously issued alarms that were not communicated and at least temporary suppressions of alerts.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A smoke detector system, comprising:
a smoke detection element; and
at least one of a door sensor and a window sensor,
the smoke detection element being communicative with the at least one of the door sensor and the window sensor and configured to read a status of the at least one of the door sensor and the window sensor and to take action related to one or more of:
a remote user notification of status;
a change in monitoring of parameters; and
a local user indication related to sensor status,
wherein, during user absences characterized by a heating, ventilation and air-conditioning (HVAC) system being non-operational, less severe alerts comprise elevated temperatures and internal air quality issues and the smoke detection element suppresses the less severe alerts during the user absences.

2. The smoke detector system according to claim 1, wherein the status of the at least one of the door sensor and the window sensor comprises an opened or closed indication.

3. The smoke detector system according to claim 1, wherein:
the smoke detection element is communicative with the at least one of the door sensor and the window sensor via a local network, and
the smoke detection element is further communicative with a cloud-based network.

4. The smoke detector system according to claim 1, wherein the smoke detection element is further configured to report as to an alarm previously issued by the smoke detection element but not communicated when at least one of the door sensor and the window sensor triggers an open event.

5. The smoke detector system according to claim 1, wherein the smoke detection element is re-configurable by an authorized user other than the user to resume alarms.

6. A smoke detector system, comprising:
a smoke detection element;
a door sensor of a door of a home; and
a window sensor,
the smoke detection element being communicative with the door sensor and the window sensor, configured to read a status of the door sensor and the window sensor and to report as to the status and further configured to report as to an alarm previously issued by the smoke detection element, the door sensor and/or the window sensor but which was not communicated due to internet loss or router failure when the door is open by a member of the home.

7. The smoke detector system according to claim 6, wherein the status of the door sensor and the window sensor comprises an opened or closed indication.

8. The smoke detector system according to claim 6, the smoke detection element is communicative with the door sensor and the window sensor via a local network.

9. The smoke detector system according to claim 8, wherein the local network is a Bluetooth™ network.

10. The smoke detector system according to claim 8, wherein the smoke detection element is further communicative with a cloud-based network.

11. The smoke detector system according to claim 6, wherein the smoke detection element is configurable to suppress alerts during user absences.

12. The smoke detector system according to claim 11, wherein the smoke detection element is re-configurable by an authorized user other than the user to resume alarms.

13. A smoke detector system, comprising:
- a smoke detection element;
- a door sensor; and
- a window sensor,
- the smoke detection element being communicative with the door sensor and the window sensor, configured to read a status of the door sensor and the window sensor and to report as to the status,
- wherein, during user absences characterized by a heating, ventilation and air-conditioning (HVAC) system being non-operational, less severe alerts comprise elevated temperatures and internal air quality issues and the smoke detection element suppresses the less severe alerts during the user absences.

14. The smoke detector system according to claim 13, wherein the status of the door sensor and the window sensor comprises an opened or closed indication.

15. The smoke detector system according to claim 13, the smoke detection element is communicative with the door sensor and the window sensor via a local network.

16. The smoke detector system according to claim 15, wherein the local network is a Bluetooth™ network.

17. The smoke detector system according to claim 15, wherein the smoke detection element is further communicative with a cloud-based network.

18. The smoke detector system according to claim 13, wherein the smoke detection element is re-configurable by an authorized user other than the user to resume alarms.

19. The smoke detector system according to claim 13, wherein the smoke detection element is further configured to report as to an alarm previously issued by the smoke detection element, the door sensor and/or the window sensor but which was not communicated.

* * * * *